(No Model.)
L. BING.
INDICATOR FOR CARD PLAYERS.
No. 405,762. Patented June 25, 1889.
Fig. 1.
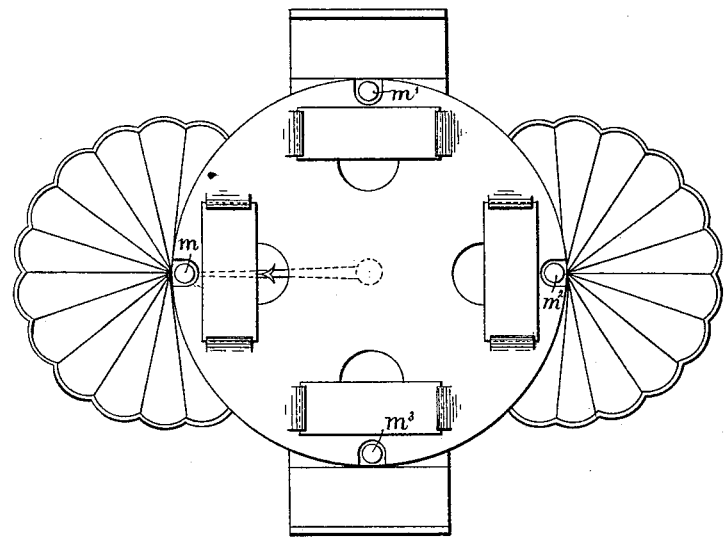
Fig. 2.
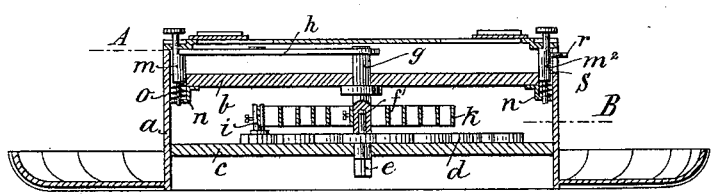
Fig. 3.
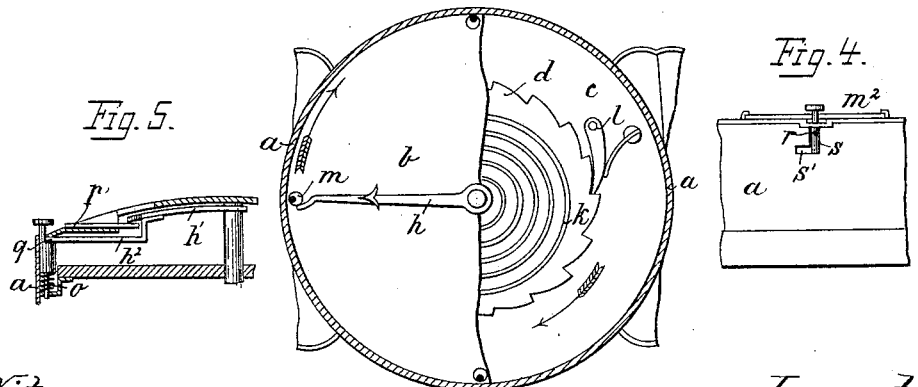
Fig. 4.
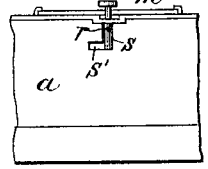
Fig. 5.
Witnesses:
H. de Bos.
E. L. Richards
Inventor:
Ludwig Bing,
By Richards &c.
Attorneys.
N. PETERS, Photo-Lithographer, Washington, D. C.

UNITED STATES PATENT OFFICE.

LUDWIG BING, OF BERLIN, GERMANY.

INDICATOR FOR CARD-PLAYERS.

SPECIFICATION forming part of Letters Patent No. 405,762, dated June 25, 1889.

Application filed February 20, 1889. Serial No. 300,553. (No model.)

*To all whom it may concern:*

Be it known that I, LUDWIG BING, of the city of Berlin, in the Empire of Germany, have invented a certain new and useful Improved Indicator for Card-Players, of which the following is a specification.

My invention relates to an indicator for card-players, its object being to indicate the person who has to "deal" the cards, the said indicator being applicable to almost any game at cards.

The apparatus is provided at its upper surface with four or more ivory, slate, or other small plates, on which the names of the players can be written or otherwise affixed. The name of the person whose turn it is to deal the cards is indicated by an appropriate pointer, which is successively caused to stop in consecutive order at one of the small plates containing the names of the players, and is detained by a stud, pin, or peg until the knob or button of the same is operated, so that the pointer, which is automatically operated by a suitable watch-spring, moves round to the next name.

The apparatus, as respresented in the accompanying drawings, is arranged for four players; but if a smaller number of players desire to use the apparatus the corresponding knob or button, knobs or buttons, are removed or depressed, so that the arresting-arm can pass the same without hinderance.

Figure 1 is a plan or top view of the apparatus. Fig. 2 is a vertical section, and Fig. 3 a horizontal section on the line A B in Fig. 2. Fig. 4 is the elevation of a part of the apparatus with the arresting device for the pointer $h$, the arm of which is provided with an arrow-tip, as represented in Fig. 3. Fig. 5 is the section of a modified arrangement of the apparatus.

The case $a$ of the apparatus is divided into two compartments by the walls $b$ $c$. A ratchet-wheel $d$ is arranged in the lower compartment, and is provided with a spindle $e$, which passes through the wall $c$ and is squared off at its upper end. The reduced end $f'$ of the spindle $e$ fits into the spindle $g$, which passes through the wall $b$ and carries at its upper end the pointer or arm $h$. A pin $i$ is arranged on the ratchet-wheel $d$, to which the one end of a watch or other suitable spring $k$ is attached, the other end of which is fixed to the spindle $g$. The spring $k$ is put under tension by turning the ratchet-wheel $d$ in the direction of the arrow, Fig. 3, by means of a key placed on the squared end of the spindle $e$, whereas the spring is prevented from unwinding by means of the pawl $l$, which gears into the ratchet-wheel $d$ and is kept in gear with the same by a suitable spring and by means of the pointer or arm $h$ on the spindle $g$.

In order to permit the spring to move the pointer from one name-plate to the other, the arresting device is so arranged that a slight pressure on the knob or button will release the pointer $h$. For this purpose each arresting device $m$ $m'$ $m^2$ $m^3$ is arranged at its lower end in a casing $n$ and is surrounded by a spring $o$, while the upper weaker end, which passes through the casing $a$, is provided with a knob or button, whereas the larger central part is guided in a slot or recess in the plate $b$.

If the pointer $h$, which is visible through openings in the cover of the casing which carries the name-plates and points to the same for indicating the card "dealer," is released by depressing the knob or button, so that the weaker upper end of the arresting device is depressed until the pointer loses its hold of the arresting device, the said pointer will be impelled forward by the spring $k$ to the next arresting-pin $m'$, when the pointer is again arrested and indicates the name of the player whose turn it is to deal cards. The depressed arresting-pin $m$ is again raised by the spring $o$, in order to again arrest the pointer when it again reaches this point.

If only three players are engaged, one of the arresting pins or pegs—for instance, $m^2$, Fig. 4—can be put out of operation, for which purpose a cross-pin $r$ is arranged to glide in a slot of the casing $a$, so that the same can be turned into the extension $s'$ of the slot, and thus prevent the knob or button from being raised by the spring $o$, and so that the pointer can pass the same without hinderance; or a small slide can be used for a like purpose.

Fig. 5 represents a modified arrangement of the ivory or other name-plate $p$. The same is inserted under the somewhat curved cover of the casing. The pointer $h'$ is located above the name-plate $p$, and is provided with the arm $h^2$, which passes under the plate $p$ and lies behind the arresting-pin $q$.

The apparatus can be provided with an ash-tray, a cigar-rest, and match-box stand.

It will be evident that the arrangement of the parts can be modified in many ways without departing from the nature of my invention.

Having now particularly described and ascertained the nature of my said invention, what I claim is—

1. In an indicating apparatus for card-players, the combination, with a suitable stand or support, of a pivoted spring-actuated pointer and a series of movable arresting pins or studs adapted to arrest or permit the passage of the pointer, substantially as set forth.

2. In an indicating apparatus for card-players, the combination, with a suitable stand or support, of a pivoted spring-actuated pointer, a ratchet and pawl for compressing and holding said spring, and a series of movable arresting pins or studs adapted to arrest or permit the passage of the pointer, substantially as set forth.

3. In an indicating apparatus for card-players, the combination, with a suitable stand or support, of a pivoted spring-actuated pointer, a ratchet and pawl for compressing and holding said spring, and a series of movable arresting pins or studs having enlarged and reduced portions and adapted to arrest or permit the passage of the pointer, substantially as set forth.

In witness whereof I have hereunto signed my name in the presence of two subscribing witnesses.

LUDWIG BING.

Witnesses:
ARTHUR BAERMANN,
ANTHONY STEFFEN.